United States Patent
Carlin et al.

(10) Patent No.: US 9,021,896 B2
(45) Date of Patent: May 5, 2015

(54) METHOD FOR DETERMINING THE QUALITY OF A SCREW JOINT TIGHTENING PROCESS PERFORMED BY AN IMPULSE WRENCH

(75) Inventors: Carl-Gustaf Carlin, Tyreso (SE); Tobias Axel Lindback, Huddinge (SE)

(73) Assignee: Atlas Copco Industrial Technique AB, Stockholm (SE)

( * ) Notice: Subject to any disclaimer, the term of this patent is extended or adjusted under 35 U.S.C. 154(b) by 0 days.

(21) Appl. No.: 13/823,725

(22) PCT Filed: Jun. 29, 2011

(86) PCT No.: PCT/EP2011/060906
§ 371 (c)(1),
(2), (4) Date: Mar. 14, 2013

(87) PCT Pub. No.: WO2012/041546
PCT Pub. Date: Apr. 5, 2012

(65) Prior Publication Data
US 2013/0192389 A1    Aug. 1, 2013

(30) Foreign Application Priority Data
Sep. 30, 2010 (SE) ..................................... 1051016

(51) Int. Cl.
*G01L 5/24* (2006.01)
*B25B 23/14* (2006.01)
*B25B 21/02* (2006.01)

(52) U.S. Cl.
CPC ................. *G01L 5/246* (2013.01); *B25B 21/02* (2013.01); *B25B 23/1405* (2013.01)

(58) Field of Classification Search
USPC ...................................................... 73/862.21
See application file for complete search history.

(56) References Cited

U.S. PATENT DOCUMENTS

| | | | |
|---|---|---|---|
| 5,493,913 A * | 2/1996 | Layer et al. ..................... | 73/761 |
| 6,234,028 B1 * | 5/2001 | Schindler et al. ............... | 73/761 |
| 6,341,533 B1 * | 1/2002 | Schoeps ..................... | 73/862.23 |
| 7,424,919 B2 * | 9/2008 | Friberg ............................. | 173/1 |
| 2009/0308624 A1 * | 12/2009 | Shibata et al. .................... | 173/1 |

FOREIGN PATENT DOCUMENTS

EP    0 652 080 A1    5/1995

OTHER PUBLICATIONS

International Search Report (ISR) and International Preliminary Report on Patentability (IPRP) dated Sep. 15, 2011, issued in parent International Application No. PCT/EP2011/060906.

* cited by examiner

*Primary Examiner* — Lisa Caputo
*Assistant Examiner* — Jamel Williams
(74) *Attorney, Agent, or Firm* — Holtz, Holtz, Goodman & Chick PC

(57) ABSTRACT

A method for determining the quality of a screw joint tightening process performed by means of a torque impulse wrench, comprising clamp load determination via calculation of the time of flight for ultra sonic waves induced into the screw joint, and comparing of a total rotation movement of the screw joint with predetermined angle limit values as a target axial load level has been indicated by the time of flight of ultra sonic waves induced in the screw joint. Occurring discrepancies between the obtained total rotation movement of the screw joint and the angle limit values would indicate a faulty screw joint and/or a malfunctioning ultra sonic wave flight time measurement, which means an unacceptable tightening process quality.

2 Claims, 1 Drawing Sheet

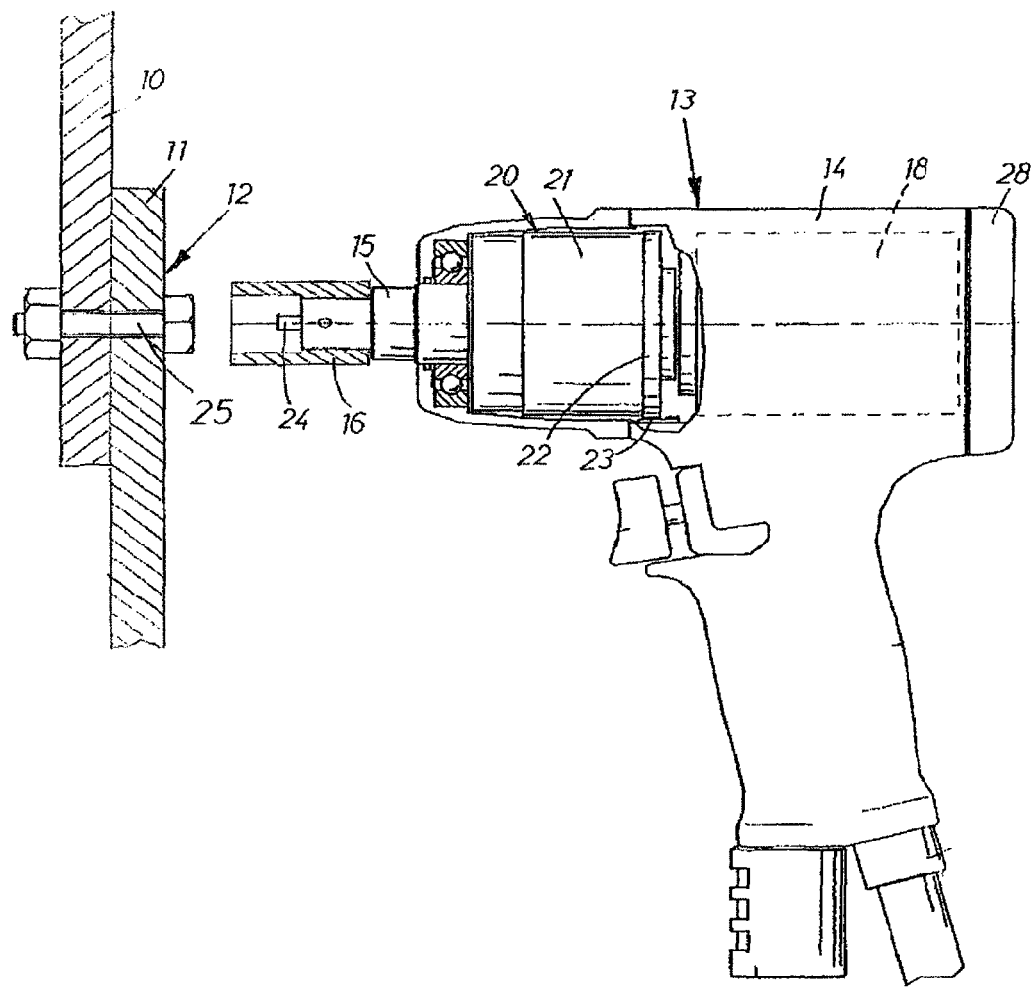

METHOD FOR DETERMINING THE QUALITY OF A SCREW JOINT TIGHTENING PROCESS PERFORMED BY AN IMPULSE WRENCH

BACKGROUND OF THE INVENTION

1. Field of the Invention

The invention relates to a method for determining the quality of a screw joint tightening process, wherein the screw joint is tightened by means of a torque impulse wrench.

2. Description of the Related Art

There is a problem to correctly determine the status and/or quality of a screw joint tightening process, including the result of the tightening process, when using a torque impulse wrench for tightening the screw joint. Ultrasonic technique, i.e. measuring the time of flight of ultrasonic waves through the screw joint, has been used to get an indication of the clamp load obtained by the screw joint at a completed tightening process. Although the accuracy of this clamp load indication method in most cases is accurate enough it may not be good enough to get that high degree of reliable clamp load indication required at high precision screw joints. In addition, there are a number of cases where the screw joint parts are faulty and unable to result in an acceptable screw joint quality. For example, some screw joints may suffer from a wrong clamp length, premature yield, peak-jumping etc., which influence negatively on the screw joint quality after tightening. These problems are not safely detected by the ultrasonic method alone.

A conceivable way to solve this problem might be to combine the clamp load indication obtained via measurement of the ultrasonic wave flight time through the screw joint by for instance a torque measurement such that two independent readings would reveal any faults of the screw joint or the tightening process. Because of the inherent intermittent dynamic action of an impulse wrench, however, it is impossible or at least very difficult to get reliable information of the delivered torque magnitude by using a torque sensor in an impulse wrench.

BRIEF SUMMARY OF THE INVENTION

It is an object of the invention to provide a solution to the above described problem. In particular, the invention provides a method for investigating and/or determining the quality of a screw joint tightening process performed by means of an impulse wrench, wherein ultrasonic technique is used for indicating the clamp load of the screw joint, and a reading of a redundant parameter not influenced by the dynamic forces of the impulse tightening process is used in combination with the clamp load indication for assessing the quality and/or result of the screw joint tightening process.

Further objects and advantages of the invention will appear from the following specification and claims.

A preferred embodiment of the invention will be described below in further detail with reference to the accompanying drawing.

BRIEF DESCRIPTION OF THE DRAWING

FIG. 1 schematically illustrates an impulse wrench adapted to perform the method according to the invention.

DETAILED DESCRIPTION OF THE INVENTION

The method according to the invention concerns quality checking of a screw joint tightening process when clamping together two parts 10, 11 by means of a screw joint 12. The tightening process is performed by a type of torque impulse wrench 13 that includes a housing 14, an output shaft 15 provided with a nut socket 16, and a rotation motor 18 which is coupled to the output shaft 15 via an impulse generating unit 20. The latter comprises an inertia drive member 21 connected to the motor 18 and a hydraulic coupling for intermittently transfer kinetic energy from the inertia drive member 21 to the output shaft 15. The impulse generating unit 20 is provided with an angle encoder or rotation detecting device in the form of a sequentially magnetised ring 22 secured to the inertia drive member 21, and a stationary sensor unit 23 secured to the housing 14 close to the magnetised ring 22 and arranged to deliver signals in response to magnetic poles of the magnetised ring 22 passing it at rotation of the inertia drive member 21. The total lapsed rotation angle over a tightening process comprises the sum of the angular increments obtained at each torque impulse delivered to the screw joint. An impulse wrench having this type of angle encoder is previously described in U.S. Pat. No. 7,424,919.

The impulse wrench adapted to perform the method according to the invention also comprises an ultra sonic wave element 24 and a non-illustrated control unit for calculating the time of flight for the ultra sonic waves through the screw joint. The control unit is located in a rear part 28 of the housing 14 and communicates with the ultra sonic wave element 24 via conduit extending through the impulse unit 21 and the motor 18. The ultra sonic wave element 24 is carried on the output shaft 15 inside the nut socket 16 and intended to both generate and detect ultra sonic sound waves.

During a screw joint tightening process the nut socket 16 and the ultra sonic wave element 24 are intended to engage the head of a screw 25 which forms a part of the screw joint 12. The nut socket 16 is intended to transfer tightening torque impulses to the screw 25, whereas the purpose of the ultra sonic wave element 24 is to induce ultra sonic waves into the screw 25 and to receive the echoes of returning waves after they have been reflected at the opposite end of the screw 25. The ultra sonic wave signals are communicated to the control unit, and in a well known manner the travel time or time of flight for the ultra sonic waves through the screw 25 is calculated and used for calculating the axial tension and clamp load applied on the screw 25.

The method according to the invention is based on the experience that calculation of the clamp load applied on a screw joint by using the time of flight for the ultra sonic waves through the screw alone may in some cases not be safe enough to get a reliable information of the actually obtained clamp load, because occurring irregularities or faults on the screw joint could give an erroneous information of the obtained clamp load. Also, the equipment for the ultra sonic wave investigation of the screw clamp load could malfunction and give erroneous information. Nevertheless, the method according to the invention is based on the ultra sonic wave time of flight method for detecting the clamp load obtained by the screw 18, but in order to get independent information on the result of the tightening process the angular distance lapsed during the tightening process is compared with predetermined limit values. This means that occurring faults on the screw joint that would give false information on the actually obtained clamping load in the screw joint via the ultra sonic wave technique can be detected via the total lapsed angular displacement of the screw joint at the end of tightening. The angle limits for an acceptably performed tightening process are determined at a pre-tightening study, wherein a number of similar good condition screw joints are tightened to a desired clamp load based on the time of flight of ultra sonic waves, and a normal scattering of the angular displacements indicated at the complete tightening processes is determined and used for establishing acceptable angle limits.

If during production tightening of a screw joint of the actual type a desired clamp load is obtained as confirmed by a calculation based on the time of flight of ultra sonic waves through the screw joint but the indicated total angular displacement of the screw joint does not comply with the pre-tightening established limit values there is generated NOK signal. So, although the axial load calculated from the indicated time of flight for the ultra sonic waves has reached its target value the actually obtained axial load is not of the desired magnitude due to a faulty or damaged screw joint. In this situation the screw joint has to be dismantled and examined for occurring faults. Particularly in a critical type of screw joint this auxiliary angle registration is essential for guaranteeing the quality and safety of the structure including the actual screw joint. A NOK signal may also indicate an error in the ultra sonic wave time of flight measurement, which means that the ultra sonic wave operating equipment should be checked and if necessary mended.

The invention claimed is:

1. A method for determining the quality of a screw joint tightening process wherein a screw joint is tightened by a torque impulse wrench, the method comprising:

indicating, during the tightening process, a clamp load obtained in the screw joint by repeatedly monitoring a time of flight of ultrasonic waves induced in the screw joint during the tightening process;

indicating rotational movement of the screw joint during the tightening process based on an output of a rotary encoder; and comparing the obtained clamp load and the indicated rotational movement of the screw joint with predetermined limit values to investigate quality acceptance for the performed tightening process, wherein said rotational movement is obtained by summarizing successive rotational increments obtained by the rotary encoder at repeated torque impulses.

2. The method according to claim 1, wherein said successive rotational increments are indicated as a stepwise displacement of a stop point of an inertia drive member of an impulse mechanism of the impulse wrench at each successive impulse where kinetic energy is transferred from the inertia drive member to an output shaft of the impulse wrench.

\* \* \* \* \*